F. Q. RAST.
LIQUID GAGE AND INDICATOR USED WITH GASOLENE TANKS FOR AUTOMOBILES AND THE LIKE.
APPLICATION FILED MAY 10, 1919.
1,371,395.  
Patented Mar. 15, 1921.
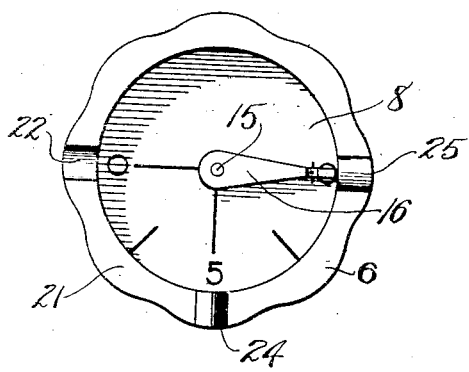
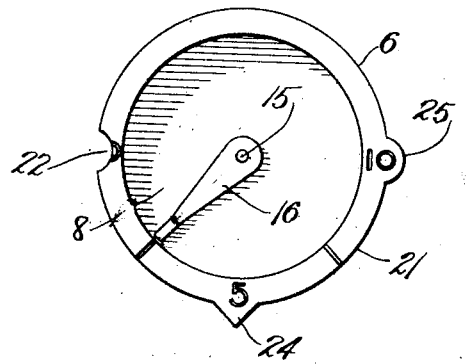
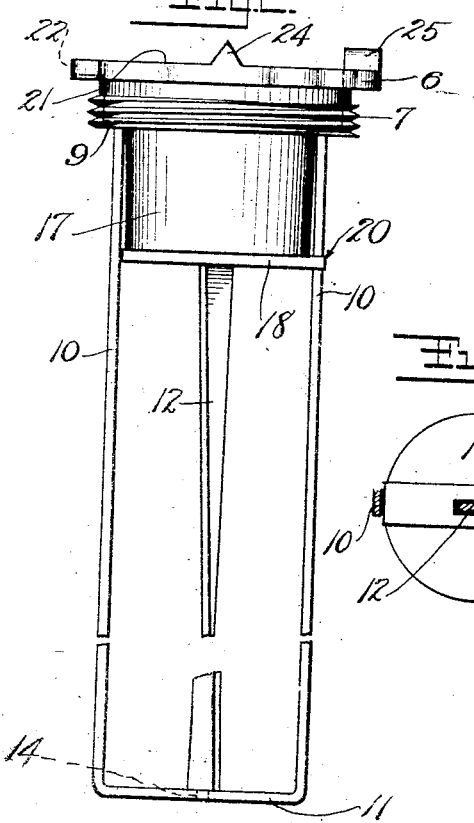
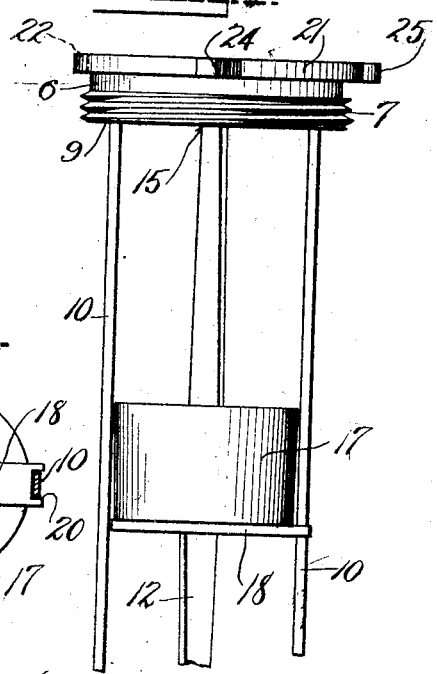
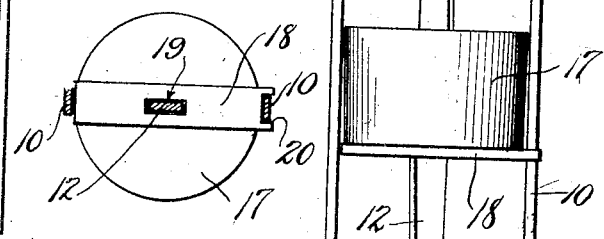
INVENTOR  
Felix Q. Rast  
BY  
Frank G. Kent  
ATTORNEY

UNITED STATES PATENT OFFICE.

FELIX Q. RAST, OF NEW YORK, N. Y.

LIQUID GAGE AND INDICATOR USED WITH GASOLENE-TANKS FOR AUTOMOBILES AND THE LIKE.

1,371,395.

Specification of Letters Patent.   Patented Mar. 15, 1921.

Application filed May 10, 1919. Serial No. 296,159.

*To all whom it may concern:*

Be it known that I, FELIX Q. RAST, a citizen of the United States, residing at New York, in the county of New York and State of New York, have invented certain new and useful Improvements in Liquid Gages and Indicators Used with Gasolene-Tanks for Automobiles and the like, of which the following is a specification.
This invention relates to liquid gages and indicators such as are particularly adapted for use with the gasolene tanks of automobiles and the like. Gages are in common use in which the level of gasolene in a tank is visually indicated by means of a dial and indicator needle, through the intermediary of float-actuated connections, but such indicators cannot be read in the dark. And there are automobiles in very general use which are not provided with any gasolene gage, so that in order to ascertain how much gasolene is contained in the tank it is necessary to remove the closure cap from the tank, insert a rod or stick and guess at the contents of the tank by an inspection of the rod or stick after it is withdrawn from the tank. This is inconvenient, unsatisfactory and uncertain, and dangerous when done in the dark, because in the latter event it involves the use of a light and if the light be a naked flame, as for instance from a burning match, there is always danger of explosion and fire.

By my invention I aim to provide a gasolene gage and indicator which may be readily applied to the ordinary gasolene tank, and which when in position gives both a visual and a tactual indication, so that the contents of the tank may be ascertained in the dark as well as in the light.

Another object is to provide a construction attaining the objects last-above stated which is simple and cheap to manufacture and which may be readily applied to the usual gasolene tank without changing the construction of the tank and without the use of any tools.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claim.

In the accompanying drawings, which are to be taken as part of this specification, and in which I have shown merely a preferred form or embodiment of the invention, Figure 1 is a top plan view of one form or embodiment of my invention; Fig. 2 is a side elevation with parts broken away illustrating the subject-matter of Fig. 1; Fig. 3 is a view similar to Fig. 1 showing a slightly modified form of construction; Fig. 4 is a view similar to Fig. 2 and illustrating in side elevation the construction of Fig. 3; and Fig. 5 is a detail in bottom plan view of the float and the parts connected therewith.

Referring to the numerals on the drawings, there is shown at 6 a closure cap for a gasolene tank having a depending exteriorly threaded part 7 for engagement in the corresponding interiorly threaded filling opening of a tank. The upper face of this closure cap 6 may be sunk as indicated at 8, and provided with a dial having indicator marks as shown in Fig. 1, for visual indication. Depending from the lower face 9 of the closure cap is a pair of arms in the form of rods 10, and these arms 10 are conveniently connected at their lower ends by means of a cross-bar 11, so that the arms 10 and cross-bar 11 constitute an integral U-shaped member, the cross-bar 11 serving as a stop to limit the downward movement of the float as hereinafter described, and also supporting one end of an oscillatory rod 12. This rod 12 is oblong in cross section and twisted from end to end. The lower end of the rod 12 is reduced to provide a pivot 14 which is accommodated in an opening midway of the length of the cross-bar 11; and the upper end of the rod 12 is also reduced to form a pivot which extends through a central aperture in the closure cap 6, the protruding end of this reduced portion 15 of the upper end of the rod 12 carrying an indicator arm or needle 16 which sweeps over the dial 8. The numeral 17 indicates a float, of cork or other suitable material centrally apertured and carrying, diametrically across its lower face, a flat plate 18 which is provided with an oblong aperture 19 in registry with the central aperture of the float 17. This plate 18 has one or both ends extending beyond the periphery of the float, and cut out, as indicated at 20, to provide a guide or guides for engagement with one or both of the side rods 10; and the spiral or twisted rod 12 passes through the central aperture of the float and the oblong aperture 19 of the plate 18. The length of the aperture 19 is but very slightly greater than the width of the rod 12, and the width of the aperture 19 is but very slightly greater than the thickness of the rod 12. As the float changes its vertical position with changes in the level of gasolene in the tank it travels up or down with respect to the rod 12, and since by reason of the guide or guides 20 the float is restrained against any but vertical movement, the vertical travel of the float will bring about a corresponding rotation of the rod 12 and consequent movement of the indicator needle or arm 16.

In Figs. 1 and 2 the parts are in position as they will appear when the tank is full and the float consequently at the limit of its upward travel, while in Figs. 3 and 4 the parts are in the position which they will occupy when the tank is empty and the float at the lowered limit of its travel.

The position of the indicator arm or needle 16 with relation to the visual indicator marks gives visual evidence of the liquid level within the tank. And in order to make possible a corresponding reading in the dark I may provide either on the upper horizontal face or rim 21 of the closure cap, as in Fig. 1, or on the vertical edge portions or periphery of the cap as in Fig. 3, tactually distinct indicator portions corresponding respectively with certain of the visually distinct indicator markings of the dial. In Fig. 1 there is a depression 22 in the rim corresponding to the marking "0" of the dial, a pointed projection or lug part 24 corresponding to the indicator marking "5" of the dial and a rounded projection or lug 25 corresponding to the marking "10" of the dial. In Fig. 3 there is no dial underneath the indicator needle, but the dial markings "0"—"5" and "10" are placed on the rim 21 of the cap and adjacent each of these three markings are tactually distinct markings 22—24 and 25, corresponding to those of Fig. 1. With these tactually distinct indicator portions it is evident that having found by touch the position of the indicator needle, the relation of this position to the adjacent one or ones of the tactually distinct markings may be readily found and thus a reasonably accurate determination made of the contents of the tank, even in the dark. It will be observed that both the visual and tactual indicator markings or portions have a fixed relation to each other and to the several positions of the indicator needle, and these relations are maintained regardless of the angular position of the cap with respect to the tank.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claim is intended to cover all the generic and specific features of the invention herein described and all statements of the scope of the invention which, as a matter of language, might be said to fall therebetween.

I claim:—

A registering device for a liquid tank comprising a flanged plate removably secured within an opening in the tank, an indicator movable over the outer face of the plate, visual markings arranged on said plate to indicate the movements of said movable indicator, tactual markings arranged on the flanged portion of the plate corresponding to certain of the visual indicator markings, a member passing through the plate and connected to the indicator to cause the same to indicate the liquid level within the tank, the several markings having a fixed relation to each other and to the several positions of the indicator regardless of the rotative position of the plate within the tank opening.

In testimony whereof I affix my signature.

FELIX Q. RAST.